United States Patent [19]

Shibasaki et al.

[11] Patent Number: 5,270,946

[45] Date of Patent: Dec. 14, 1993

[54] METHOD AND APPARATUS FOR CONTROLLING SELECTION OF BATTERIES

[75] Inventors: Kazuya Shibasaki, Tokyo; Hironori Ito, Oome; Yasuhiro Ohashi, Oome; Masahiko Kasashima, Oome, all of Japan

[73] Assignee: Kabushiki Kaisha Toshiba, Kawasaki, Japan

[21] Appl. No.: 908,906

[22] Filed: Jul. 2, 1992

Related U.S. Application Data

[63] Continuation of Ser. No. 747,478, Aug. 13, 1991, abandoned, which is a continuation of Ser. No. 624,520, Dec. 7, 1990, abandoned, which is a continuation of Ser. No. 327,261, Mar. 22, 1989, abandoned.

[30] Foreign Application Priority Data

| Mar. 30, 1988 | [JP] | Japan | 63-42679[U] |
| Mar. 31, 1988 | [JP] | Japan | 63-43760[U] |
| Apr. 28, 1988 | [JP] | Japan | 63-105904 |

[51] Int. Cl.$^5$ .......................... G06F 15/20; H02J 7/00
[52] U.S. Cl. ...................... 364/492; 307/66; 320/48; 320/49; 320/31; 364/418; 364/483; 395/750
[58] Field of Search .......... 307/66; 395/750; 364/480, 481, 483, 492, 431.11, 207; 340/635, 636, 661, 662, 663; 320/6, 31, 32, 33, 34, 39, 48, 40, 49

[56] References Cited

U.S. PATENT DOCUMENTS

| 3,757,302 | 9/1973  | Politt .          |           |
| 4,061,955 | 12/1977 | Thomas et al.     | 320/6     |
| 4,143,283 | 3/1979  | Graf et al.       | 307/66    |
| 4,234,920 | 11/1980 | Van Ness et al.   | 364/DIG. 1|
| 4,307,455 | 12/1981 | Juhasz et al.     | 364/DIG. 2|
| 4,458,307 | 7/1984  | McAnlis et al.    | 364/DIG. 1|
| 4,559,497 | 12/1985 | Farrugia          | 340/661   |
| 4,564,798 | 1/1986  | Young             | 320/31    |
| 4,593,349 | 6/1986  | Chase et al.      | 364/492   |
| 4,611,289 | 9/1986  | Coppola           | 364/492   |
| 4,618,779 | 10/1986 | Wiscombe          | 364/492   |
| 4,633,418 | 12/1986 | Bishop            | 364/483   |
| 4,707,795 | 11/1987 | Alber et al.      | 364/483   |
| 4,737,702 | 4/1988  | Koenck            | 320/33    |
| 4,754,160 | 6/1988  | Ely               | 307/66 X  |
| 4,792,743 | 12/1988 | Tsujino et al.    | 320/31    |
| 4,827,220 | 5/1989  | Figh              | 340/636   |
| 4,833,459 | 5/1989  | Geuer et al.      | 340/636   |
| 4,849,682 | 7/1989  | Bauer et al.      | 320/31    |
| 4,851,756 | 7/1989  | Schaller et al.   | 307/66 X  |
| 4,860,185 | 8/1989  | Brewer et al.     | 307/66 X  |
| 4,879,624 | 11/1989 | Jones et al.      | 361/66 X  |
| 5,028,806 | 7/1991  | Stewart et al. .  |           |
| 5,128,552 | 7/1992  | Fang et al.       | 307/66    |

FOREIGN PATENT DOCUMENTS 0164890 12/1985 European Pat. Off. .

OTHER PUBLICATIONS

Patent Abstrtacts of Japan vol. 10, No. 266 (P-496) (2322) Sep. 11, 1986: JP-A-61 91708 published Sep. 5, 1986 to Hiroshi Ishida.

Donald Shuman, "Step-by-Step Design Yields Battery Supply for Portable $\mu$C," EDN Electrical Design News vol. 28 (Sep. 1983), No. 19.

(List continued on next page.)

Primary Examiner—Kevin J. Teska
Attorney, Agent, or Firm—Finnegan, Henderson, Farabow, Garrett & Dunner

[57] ABSTRACT

In a battery-driven computer system, a flip-flop circuit selects one of two switches for switching a power supply to the computer system in accordance with the terminal voltages of batteries detected by detecting circuits. When the first switch is switched on, the first battery coupled to the first switch supplies its power to the computer system. In this case, the second switch is switched off and the power from the second battery coupled to the second switch is not supplied to the computer system. When the terminal voltage of the first battgnal representing the power condition of the batteries.

44 Claims, 7 Drawing Sheets

OTHER PUBLICATIONS

Patent Abstracts of Japan vol. 2, No. 106 (E–54) (5625) Aug. 13, 1978: JP-A-53 71865 published Jun. 26, 1978 to Takehiro Ishikawa.

Toshiba Personal Computer T1100 Plus Owner's Manual, Toshiba Corporation Apr., 1986.

T1200 Portable Personal Computer User's Manual, Toshiba America, Inc., 1987.

Toshiba T1600 Portable Personal Computer User's Manual, Toshiba Corporation, 1988.

Japanese Patent Abstract of Japanese Appln. No. 57-142851, Japanese Patent Abstracts, vol. 8, No. 129 (P-280) (1566), Jun. 15, 1984.

Lopour et al. "System and I/O Device Power Control Using a Microprocessor" IBM Technical Disclosure Bulletin, vol. 23, No. 5, pp. 2079–2082, Oct. 1980.

"Method for Warning Users of a Low Battery Condition on a Battery-Powered Computer" IBM Technical Disclosure Bulletin, vol. 29, No. 6, pp. 2641–2643, Nov. 1986.

Eaton et al. "Design of HP's Portable Computer Family", Hewlett-Packard Journal 37 (1986) Jul., No. 7, pp. 4–13, Amsteleveen, Netherlands.

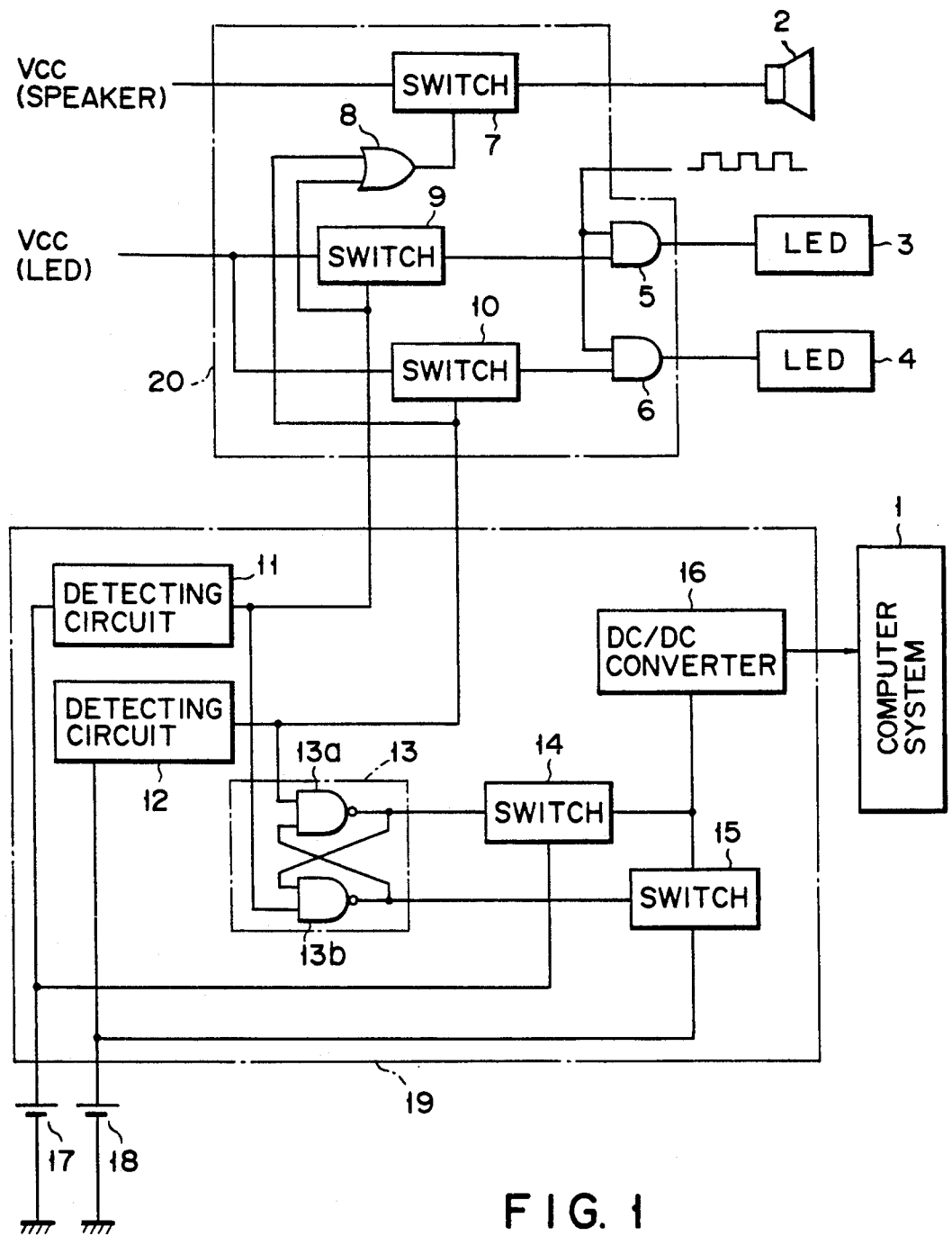
F I G. 1

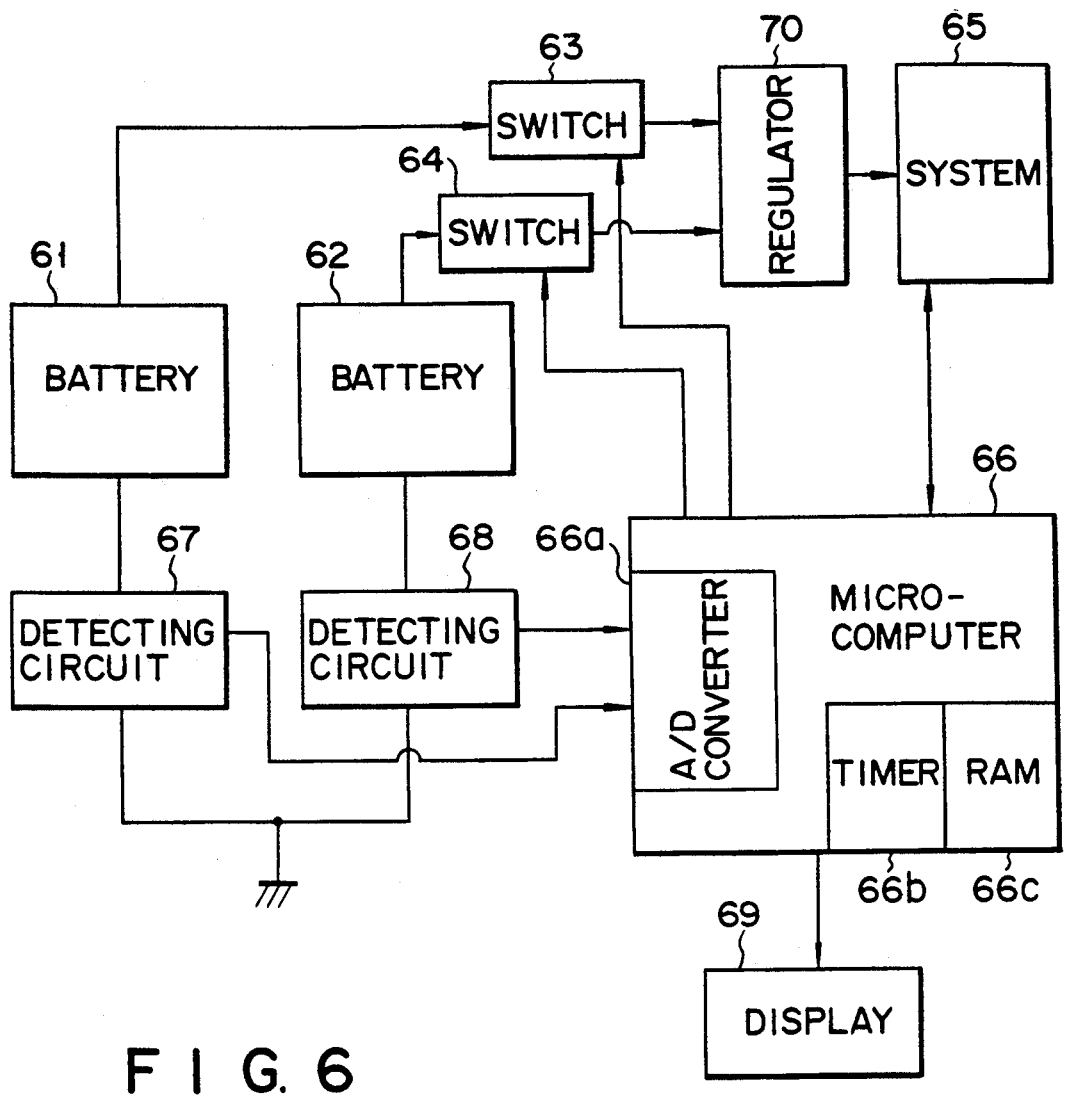
F I G. 6
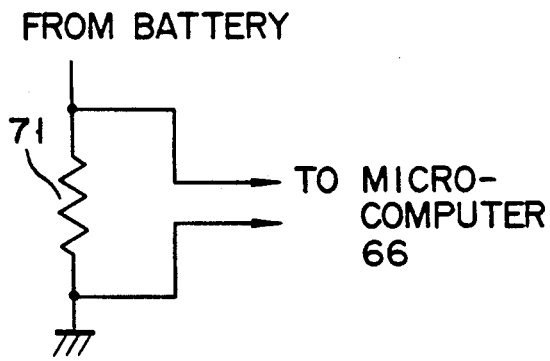
F I G. 7
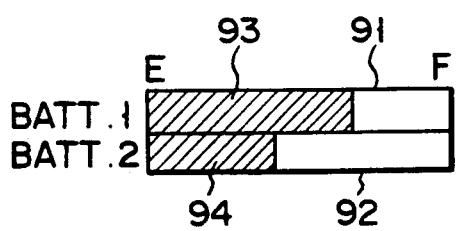
F I G. 9

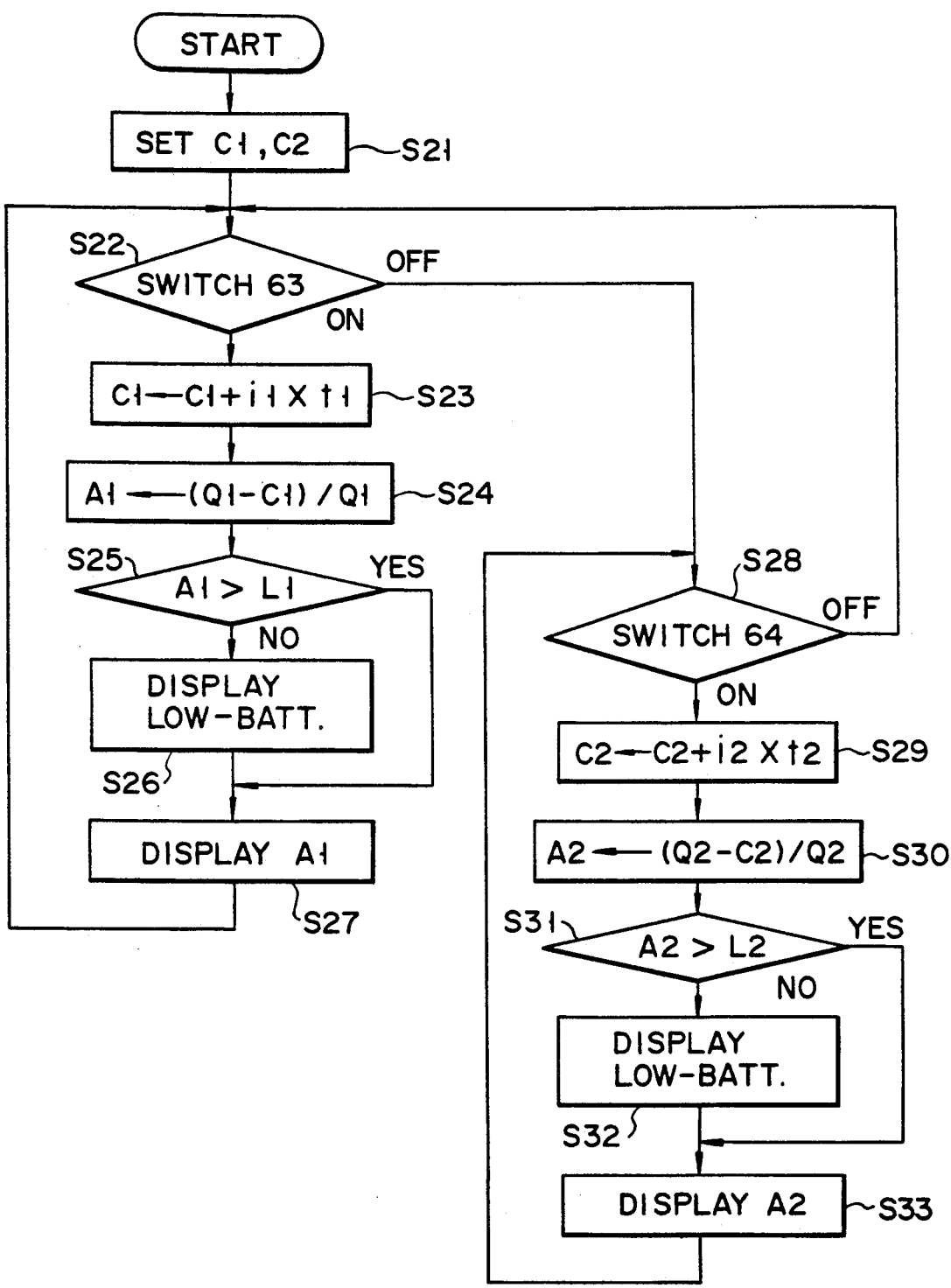
F I G. 8

METHOD AND APPARATUS FOR CONTROLLING SELECTION OF BATTERIES

This application is a continuation of application Ser. No. 07/747,478 filed Aug. 13, 1991 now abandoned which is a continuation of application Ser. No. 07/624,520 filed Dec. 7, 1990 which is a continuation of application Ser. No. 07/327,261 filed Mar. 22, 1989, both abandoned.

BACKGROUND OF THE INVENTION

1. Field of the Invention

The present invention relates to a method for controlling selection of batteries and an apparatus for realizing the same.

2. Description of the Related Art

Due to their compactness, light weight and portability, battery-driven electronic devices, such as laptop computers, are becoming popular recently. Since such devices are normally equipped with a single battery, their operation time is short. In addition, when the devices cannot operate on AC power, their operation is interrupted for battery replacement. Further, if power failure occurs during operation, data processed in the devices would be erased or it would take time to restart the operation after power recovery.

With the above in mind, there is a demand for a device which ensures battery replacement without interrupting operation of electronic devices, such as laptop computers.

SUMMARY OF THE INVENTION

Accordingly, it is an object of this invention to provide a method for controlling selection of batteries and an apparatus for realizing the same.

According to one aspect of the present invention, there is provided a method for controlling selection of a plurality of batteries for supplying power to computer system. The method includes detecting voltages of the batteries; selecting one of the batteries in accordance with the detected voltages; supplying power of the selected battery to the computer system; and alarming a power condition of the batteries in accordance with the detected voltages.

According to another aspect of this invention, there is provided an apparatus for controlling selection of a plurality of batteries for supplying power to a computer system. The apparatus includes a plurality of batteries; switching means for switching a power supply of the batteries; detecting means for detecting voltages of the batteries; controlling means for controlling the switching means in accordance with the voltages detected by the detecting means; and alarm means for alarming a power condition of the batteries in accordance with the voltages detected by the detecting means.

BRIEF DESCRIPTION OF THE DRAWINGS

FIG. 1 is a diagram of a battery switching apparatus according to the first embodiment of this invention;

FIG. 6 is a diagram of a battery switching apparatus according to the second embodiment of this invention;

FIG. 7 is a diagram of a detecting circuit of the battery switching apparatus shown in FIG. 6;

FIG. 8 is an operation flowchart for the battery switching apparatus shown in FIG. 6; and FIG. 9 is a diagram showing a remaining energy.

DETAILED DESCRIPTION OF THE PREFERRED EMBODIMENTS

Figure 2:
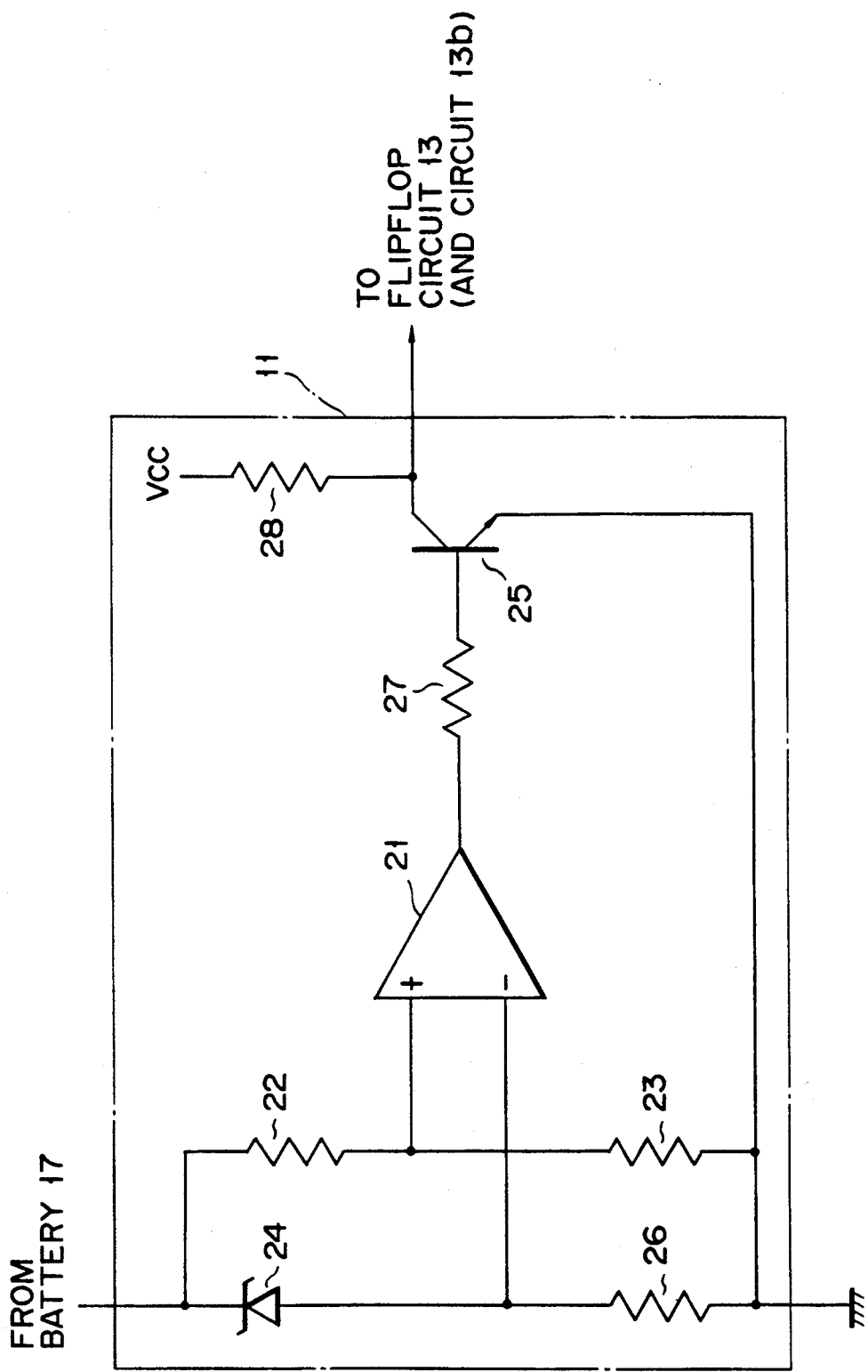
FIG. 2 is a diagram of a detecting circuit of the battery switching apparatus shown in FIG. 1.

An embodiment of this invention will be described below with reference to the accompanying drawings.

Referring to FIG. 1, the battery switching apparatus includes batteries 17 and 18 serving as power sources to operate computer system 1, selecting circuit 19 for selecting either battery 17 or 18, LEDs (Light Emitting Diodes) 3 and 4 serving to indicate consumption of energies of batteries 17 and 18, speaker 2, and drive controller 20 for controlling speaker 2 and LEDs 3 and 4.

Selecting circuit 19 has detecting circuits 11 and 12 for detecting the terminal voltages of batteries 17 and 18, switches 14 and 15 for switching the supply of power from batteries 17 and 18 to computer system 1, flip-flop circuit 13 for selecting either switch 14 or 15 in accordance with the terminal voltages detected by detecting circuits 11 and 12, DC-DC converter 16 for converting the power from batteries 17 and 18 into predetermined power. Flip-flop circuit 13 has NAND circuits 13a and 13b. Drive controller 20 has switches 9 and 10 for switching between LEDs 3 and 4 for their lighting, AND circuits 5 and 6, switch 7 for switching on or off speaker 2 for generation of an alarm such as a voice signal, and OR circuit 8 for rendering switch 7 on when one of batteries 17 and 18 is in a low battery condition. The "low battery condition" comes before the condition in which the computer system can no longer maintain the normal operation.

FIG. 2 illustrates the diagram of the detecting circuit 11. The output signal of operational amplifier 21 is determined by signals I+ and I− respectively supplied to its + and − input terminals. If the signal I+ received at the + input terminal and signal I− received at the − input terminal hold the relation of I+ ≧ I−, the output signal is at a high level. If I+ < I−, the output signal is at a low level. A reference value for detecting the low battery voltage of battery 17 is determined by the ratio of the resistances of resistors 22 and 23 and the rated value of Zener diode 24. Transistor 25 is switched on/off by the output signal of operational amplifier 21. Resistors 26 and 27 are provided to protect detecting circuit 11. Resistor 28 is provided to maintain the output signal of detecting circuit 11 at a high level when transistor 25 is off.

If the power from battery 17 is sufficient for the system to operate, the signals received at the + and − input terminals of operational amplifier 21 hold the relation of I+ ≧ I−, so that the output signal of operational amplifier 21 becomes a high level. At this time, since transistor 25 is on, the output signal of detecting circuit 11 has a low level. When the power of battery 17 decreases and the relation between signals input to the + and − input terminals of operational amplifier 21 is I+ < I−, the output signal of operational amplifier 21 becomes a low level. Transistor 25 is off and thus the output signal of detecting circuit 11 becomes a high level.

Detecting circuit 12 has the same configuration as detecting circuit 11, and therefore operates similarly.

Figure 3:
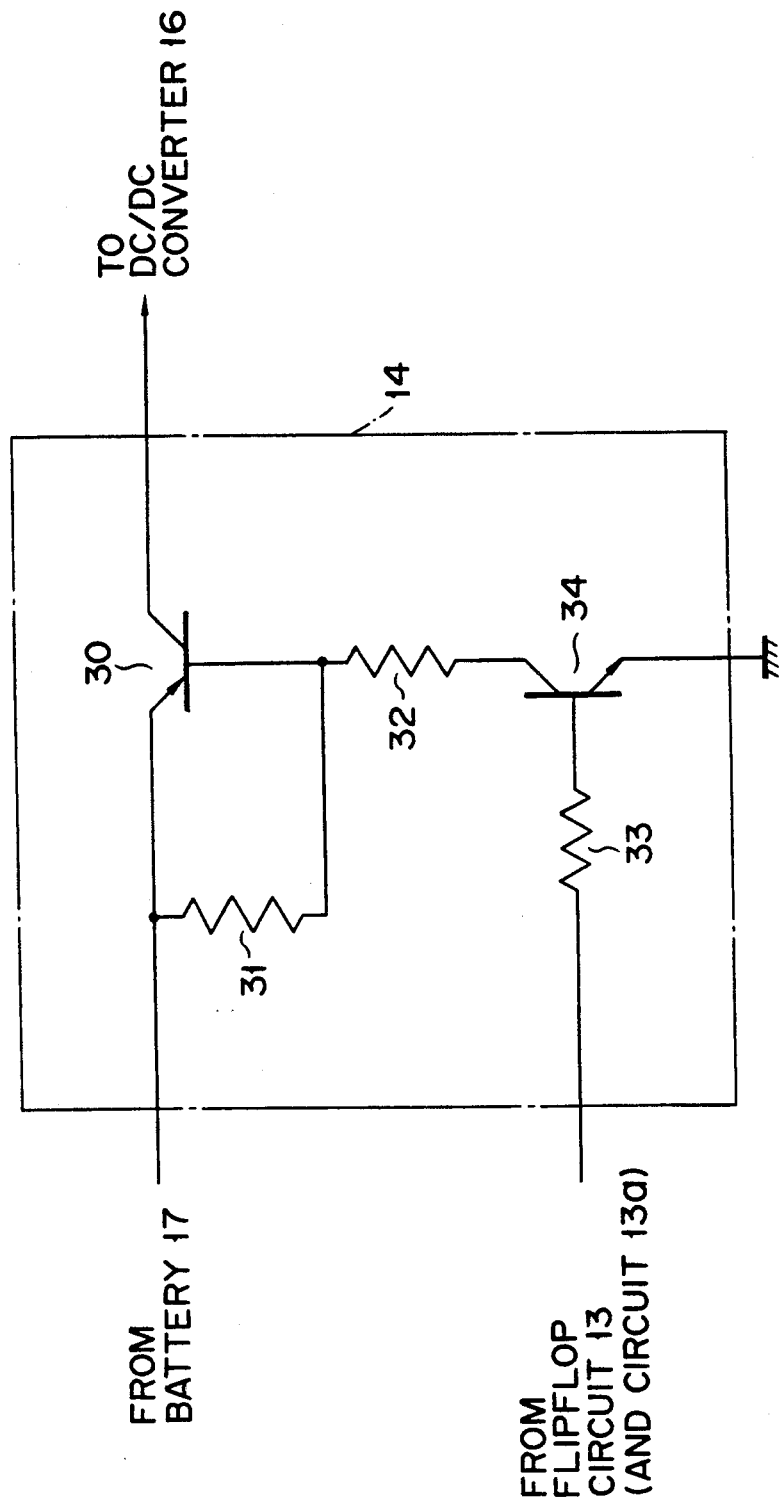
FIG. 3 is a diagram of a switch used in the battery switching apparatus shown in FIG. 1.

FIG. 3 illustrates the diagram of switch 14 which has transistors 30 and 34 and resistors 31 to 33. Transistor 34 is turned on/off by the output signal of NAND circuit 13a of flip-flop circuit 13. Transistor 30 is turned on or off in accordance with the switching of transistor 34. If transistor 34 is off, transistor 30 is on, thus the power is supplied to computer system 1 from battery 17 through DC-DC converter 16. Switches 7, 9, 10 and 15 have the same configuration as switch 14 and thus operate similarly.

Figure 4:
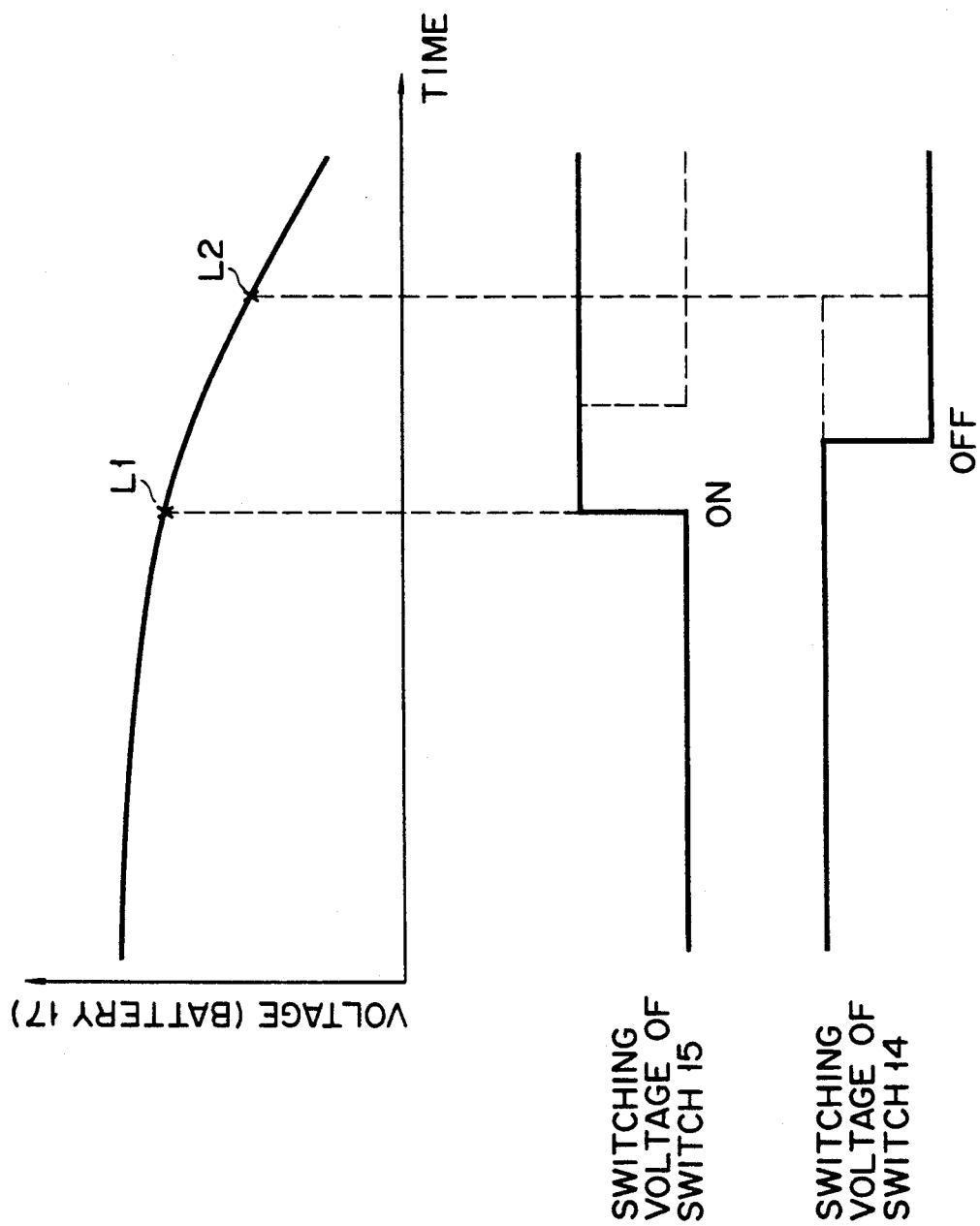
FIG. 4 is a timing chart of battery selection.

If battery 17 keeps supplying power to computer system 1 (switch 14 is on and switch 15 is off) as shown in FIG. 4, detecting circuit 11 keeps detecting the terminal voltage of battery 17. When the terminal voltage of battery 17 falls below a preset low battery voltage L1, switch 15 is on and power from battery 18 is supplied to computer system 1. When the terminal voltage of battery 18 detected by detecting circuit 12 is greater than the low battery voltage L1, switch 14 is off and the supply of the power from battery 17 is stopped (see the solid lines for the behavior of the switching voltages of switches 14 and 15 in FIG. 4). When the terminal voltage of battery 18 falls below the low battery voltage L1, switch 14 keeps switching on and switch 15 is off (see the broken lines in the same diagram). In order to inform an operator of the low battery condition, LEDs 3 and 4 blink. Therefore, it is possible to perform battery replacement before the operating voltage of the system reaches the voltage L2. The voltage L2 indicates the limit under which computer system 1 can no longer keep the proper operation.

With regard to the indication of the power condition by the LEDs, if LED 3 is not blinking, it indicates battery 17 is not used. That is, it is indicated that computer system 1 is operating on power from battery 18 or power from an external power source (not shown). When battery 17 becomes a low battery condition, LED 3 blinks, and an alarm is generated through speaker 2, indicating the low battery condition. When battery 18 becomes a low battery condition, LED 4 blinks, and an alarm is generated.

However, it is possible to generate the alarm when batteries 17 and 18 become a low power condition, by replacing OR circuit 8 for AND circuit.

Figure 5:
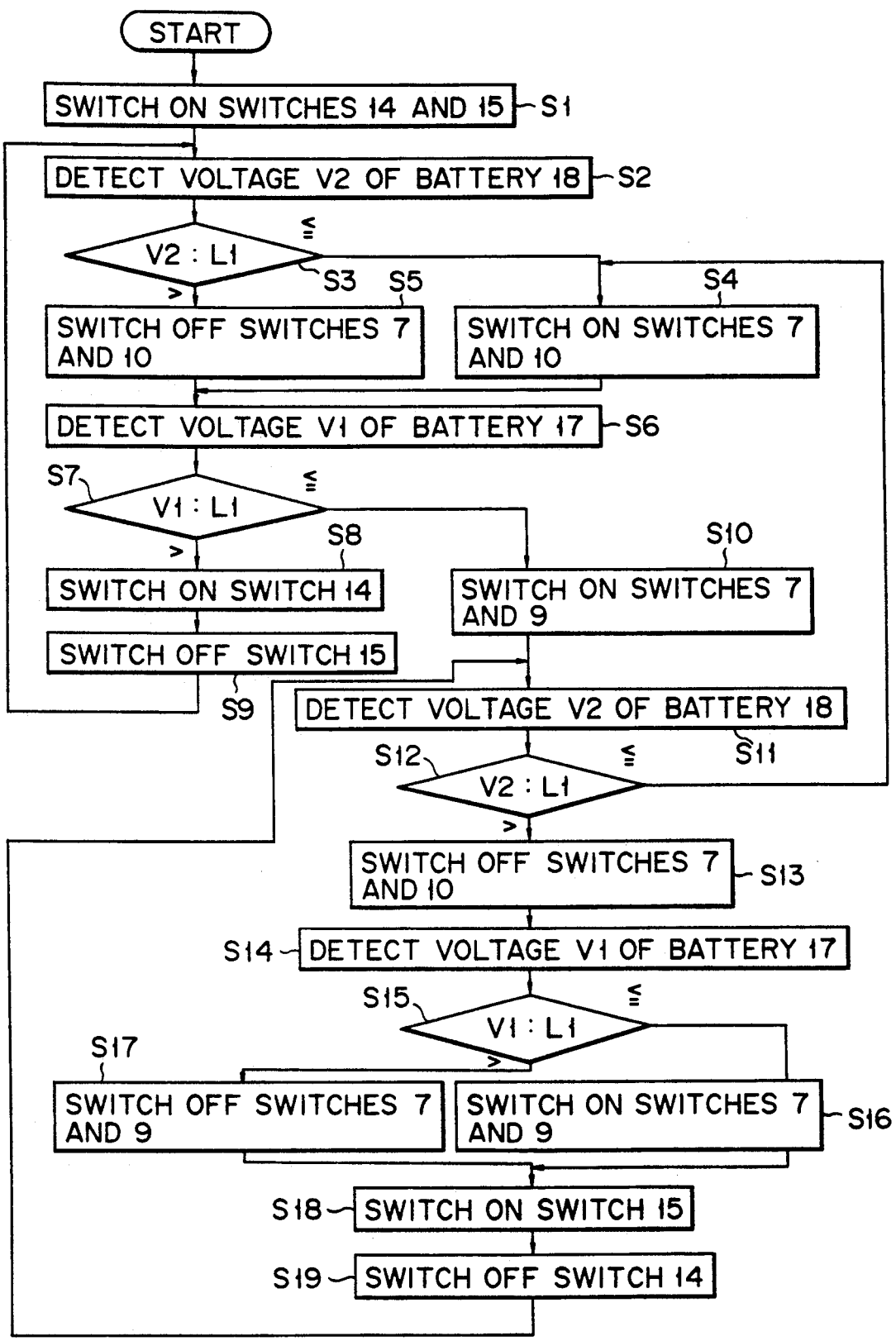
FIG. 5 is an operation flowchart for the battery switching apparatus shown in FIG. 1.

Referring now to the flowchart shown in FIG. 5, the operation of the battery switching apparatus according to this invention will be described below.

In step S1, switches 14 and 15 are switched on. After the voltage V2 of battery 18 is detected in step S2, the detected voltage V2 is compared with a preset low battery voltage L1 in step S3.

If V2>L1 in step S3, switches 7 and 10 are switched off (step S5) and the process of step S6 is then executed. If V2≦L1 in step S3, switches 7 and 10 are switched on (step S4) before the process of step S6 is executed.

The voltage V1 of battery 17 is detected in step S6. The detected voltage V1 is compared with the preset low battery voltage L1 in step 7.

If V1>L1 in step S7, switch 14 is switched on (step S8) and switch 15 is then switched off (step S9). Thereafter, the above-described operation sequence starting from step S2 is repeated. In other words, battery 17 keeps supplying its power to computer system 1 until the voltage V1 of battery 17 becomes less than or equal to the low battery voltage L1.

If V1≦L1 in step S7, switches 7 and 9 are switched on (step S10). In the subsequent step S11, the voltage V2 of battery 18 is detected, and the detected voltage V2 is compared with the low battery voltage L1 in step 12.

If V2≦L1 in step S12, step S4 (turning on switches 7 and 10) is executed and the operation starting from step S6 is then executed.

If V2>L1 in step S12, switches 7 and 10 are switched off (step S13) and the voltage V1 of battery 17 is detected in step S14. In the subsequent step S15, the voltage V1 of battery 17 is compared with the low battery voltage L1.

If V1>L1 in step S15, switches 7 and 9 are switched off (step S17) and step S18 is executed. If V1≦L1 in step S15, switches 7 and 9 are turned on (step S16) before step S18 is executed.

After switch 15 is switched on (step S18), switch 14 is switched off (step S19), and the flow returns to step S11 for execution of the operational sequence following it. In other words, the supply of the power from battery 18 to computer system 1 is maintained until the voltage V2 of battery 18 becomes less than or equal to the low battery voltage L1.

Another embodiment of this invention will be described below referring to FIG. 6. In FIG. 6, the energies remaining in batteries 61 and 62 are computed by microcomputer 66, for example, TMP47C660, manufactured by TOSHIBA in Japan. Microcomputer 66 has A/D converter 66a, timer 66b and RAM 66c. Either battery 61 or 62 is selected by its associated switch 63 or 64 that is controlled by a control signal from microcomputer 66. The power from the selected battery is supplied through regulator 70 to system 65. Switches 63 and 64 are switched by supplying the control signal from microcomputer 66 to the base side of transistor 34 in the circuit shown in FIG. 3. The outputs of detecting circuits 67 and 68 which detect the consumption energy of the batteries are supplied to A/D converter 66a of microcomputer 66. Based on the outputs of detecting circuits 67 and 68, microcomputer 66 computes the remaining energies of the batteries. The computation results are displayed in display 69. Detecting circuits 67 and 68 may be realized by the circuit shown in FIG. 7 in which a terminal voltage of resistor 71 having a known resistance is input to A/D converter 66a of microcomputer 66.

Referring now to the flowchart of FIG. 8, the operation of the embodiment shown in FIG. 6 will be described. First, data representing the energies of the batteries used so far, which are stored in RAM 66c of microcomputer 66, are respectively set as C1 and C2 (step S21). Then, the status of switch 63 is checked (step S22). The following description will be given on the premise that the power of battery 61 is supplied to system 65 (i.e., switch 63 is ON). Based on the output of detecting circuit 67, microcomputer 66 computes the consumption energy from the discharge current i1 and the time t2, which is measured by timer 66b of microcomputer 66. The total consumption energy is acquired from the computed consumption energy (i1×t1) and the energy consumed so far, C1, and the resultant value is set as a new C1 (step S23). Then, the ratio of the remaining energy to the total energy, A1, is computed from the initial battery energy Q1 of the battery 61 and the total consumption energy C1 (step S24). When A1 is smaller than a predetermined value L1 (step 25), the present status is indicated as Low-Battery (step S26);

this display may be done by LED's 3 and 4 or speaker 2 as shown in FIG. 1. The ratio A1 is then displayed on display 69 (step 27), for example, in terms of the remaining energy 93 or 94 with respect to the initial battery energy 91 to 92, as shown in FIG. 9.

When the power of battery 62 is supplied to system 65 (i.e., switch 63 is ON) in step 28, the processes in steps 29 to 33 are executed in the same manner as those in steps 23–27. That is, the consumption energy is computed from the discharge current i2 of the battery 62 and time t2, the total consumption energy is computed from the computed consumption energy and the energy consumed so far, C2, and is set as a new C2, and the ratio of the remaining energy to the total energy, A2, is computed from the initial battery energy Q2 and the total consumption energy C2. When A2 is smaller than a predetermined value L2, this status is indicated as Low-Battery and A2 is then displayed.

Since the battery in use can be detected by the statuses of switches 63 and 64, this battery can be indicated by, for example, blinking the area 91 and 92. The display section may be modified in such a way as to permit his battery indication only upon request from system 65.

Through the above operation, the operator can be informed of the timing for battery replacement. Therefore, the battery is replaced with a new one. Further, the batteries can be automatically switched from one to the other. Interruption of the operation of the computer system is not occurred at the time of battery replacement and thus ensures continuous operation of the system.

Although this invention has been described with the above particular embodiment, it is not restricted to this case but can be modified in various manners within the scope and spirit of the invention.

Further, although a battery-driven type computer system has been described above, this invention can also apply to other electronic devices which are driven by a battery.

What is claimed is:

1. An apparatus for supplying power to a device, the apparatus comprising:
   a plurality of batteries, each battery having a terminal;
   detecting means for detecting voltages of the batteries;
   means for selecting a first battery from the plurality of batteries when a detected voltage in the first battery is larger than a predetermined voltage, to supply power from the first battery to the device while conducting a positive current through the terminal of the first battery;
   means for selecting a second battery from the plurality of batteries when the detected voltage in the first battery is less than the predetermined voltage, to supply power from the second battery to the device, and for isolating the first battery from the device while conducting a current no less than zero through the terminal of the first battery;
   means for reselecting the first battery when the detected voltage in the second battery is less than the predetermined voltage; and
   signaling means for signaling a power condition of the first battery when the detected voltage in the first battery is less than the predetermined voltage.

2. The apparatus according to claim 1, wherein the detecting means includes comparing means for comparing voltages of the batteries with the predetermined voltage.

3. The apparatus according to claim 1, wherein the signaling means includes light-indicating means for representing the power condition of the first battery.

4. The apparatus according to claim 1, wherein the signaling means includes voice-outputting means for voice-outputting a signal representing the power condition of the first battery.

5. The apparatus according to claim 1, wherein the signaling means includes:
   light-indicating means for providing alight indication representing the power condition of the first battery; and
   voice-outputting means for voice-outputting a signal representing the power condition of the first battery.

6. The apparatus according to claim 1, wherein the detecting means includes
   means for generating a first signal to indicate a voltage level of the first battery, and wherein the means for selecting the second battery includes
   means for isolating the first battery in response to the first signal.

7. The apparatus according to claim 1, wherein the detecting means includes
   means for generating a first signal to indicate a voltage level of the first battery, and a second signal to indicate a voltage level of the second battery, and wherein the means for selecting the second battery includes
   means for isolating the first battery in response to the first and second signals.

8. An information processing system comprising:
   a computer system;
   a plurality of batteries for supplying power to the computer system, each battery having a terminal;
   detecting means for detecting voltages of the batteries; and
   means for selecting a first battery from the plurality of batteries when a detected voltage in the first battery is larger than a predetermined voltage, to supply power from the first battery to the computer system while conducting a positive current through the terminal of the first battery;
   means for selecting a second battery from the plurality of batteries when the detected voltage in the first battery is less than the predetermined voltage, to supply power from the second battery to the computer system, and for isolating the first battery from the computer system while conducting a current no less than zero through the terminal of the first battery;
   means for reselecting the first battery when the detected voltage in the second battery is less than the predetermined voltage; and
   signaling means for signaling a power condition of the first battery when the detected voltage in the first battery is less than the predetermined voltage.

9. The apparatus according to claim 8, wherein the detecting means includes comparing means for comparing voltages of the batteries with the predetermined voltage.

10. The apparatus according to claim 8, wherein the signaling means includes light-indicating means for representing the power condition of the first battery.

11. The apparatus according to claim 8, wherein the signaling means includes voice-outputting means for voice-outputting a signal representing the power condition of the first battery.

12. The apparatus according to claim 8, wherein the signaling means includes:
light-indicating means for providing a light indication representing the power condition of the first battery and
voice-outputting means for voice-outputting a signal representing the power condition of the first battery.

13. The apparatus according to claim 8, wherein the detecting means includes
means for generating a first signal to indicate a voltage level of the first battery, and wherein the means for selecting the second battery includes
means for isolating the first battery in response to the first signal.

14. The apparatus according to claim 8, wherein the detecting means includes
means for generating a first signal to indicate a voltage level of the first battery, and a second signal to indicate a voltage level of the second battery, and wherein the means for selecting the second battery includes
means for isolating the first battery in response to the first and second signals.

15. In a system having a device and a plurality of batteries, each battery having a terminal, a method for supplying power to the device, the method comprising the steps of:
detecting voltages of the plurality of batteries;
selecting a first battery from the plurality of batteries when a detected voltage in the first battery is larger than a predetermined voltage, to supply power from the first battery to the device while conducting a positive current through the terminal of the first battery;
selecting a second battery from the plurality of batteries when the detected voltage in the first battery is less than the predetermined voltage, to supply power from the second battery to the device, and isolating the first battery from the device while conducting a current no less than zero through the terminal of the first battery;
reselecting the first battery when the detected voltage in the second battery is less than the predetermined voltage; and
signaling a power condition of the first battery when the detected voltage in the first battery is less than the predetermined voltage.

16. The method according to claim 15, wherein the detecting step includes the step of comparing voltages of the batteries with the predetermined voltage.

17. The method according to claim 15, wherein the signaling step includes the step of providing a light indication representing the power condition of the first battery.

18. The method according to claim 15, wherein the signalling step includes the step of voice-outputting a signal representing the power condition of the first battery.

19. The method according to claim 15, wherein the signaling step includes the steps of:
providing a light indication representing the power condition of the first battery; and
voice-outputting a signal representing the power condition of the first battery.

20. The method according to claim 15, wherein the detecting step includes the substep of
generating a first signal to indicate a voltage level of the first battery, and wherein the step of selecting the second battery includes the substep of
isolating the first battery in response to the first signal.

21. The method according to claim 15, wherein the detecting step includes the substep of
generating a first signal to indicate a voltage level of the first battery, and a second signal to indicate a voltage level of the second battery, and wherein the step of selecting the second battery includes
isolating the first battery in response to the first and second signals.

22. An apparatus for supplying power to a device, the apparatus comprising:
a plurality of batteries, each battery having a terminal;
detecting means for detecting voltages of the batteries;
calculating means for calculating power consumption of the first battery from the detected voltages in the first battery, to obtain remaining power of the first battery; and
means for selecting a second battery from the plurality of batteries when the remaining power in the first battery is less than a predetermined power, to supply power from the second battery to the device, and for isolating the first battery from the device while conducting a current no less than zero through the terminal of the first battery; and
signaling means for signaling a power condition of the first battery when the obtained remaining power is less than the predetermined power.

23. The apparatus according to claim 22, wherein the apparatus further comprises displaying means for displaying the remaining power obtained by the calculating means.

24. The apparatus according to claim 22, wherein the signaling means includes light-display mans for representing the power condition of the first battery.

25. The apparatus according to claim 22, wherein the signaling means includes voice-outputting means for voice-outputting a signal representing the power condition of the first battery.

26. The apparatus according to claim 22, wherein the calculating means further includes
means for calculating power consumption of the second battery from the detected voltages in the second battery, to obtain remaining power of the second battery.

27. An apparatus for supplying power to a device, the apparatus comprising:
a plurality of batteries, each battery having a terminal;
detecting means for detecting voltages of the batteries;
means for selecting a first battery from the plurality of batteries when a detected voltage in the first battery is larger than a predetermined voltage, to supply power from the first battery to the device while conducting a positive current through the terminal of the first battery;
means for selecting a second battery from the plurality of batteries when the detected voltage in the first battery is less than the predetermined voltage, to supply power from the second battery to the device, and for isolating the first battery from the device while conducting a current no less than zero through the terminal of the first battery; and means for reselecting the first battery when the detected voltage in the second battery is less than the predetermined voltage.

28. An information processing system comprising:
a computer system;
a plurality of batteries for supplying power to the computer system, each battery having a terminal;
detecting means for detecting voltages of the batteries;
means for selecting a first battery from the plurality of batteries when a detected voltage in the first battery is larger than a predetermined voltage, to supply power from the first battery to the computer system while conducting a positive current through the terminal of the first battery;
means for selecting a second battery from the plurality of batteries when the detected voltage in the first battery is less than the predetermined voltage, to supply power from the second battery to the computer system, and for isolating the first battery from the computer system while conducting a current no less than zero through the terminal of the first battery; and
means for reselecting the first battery when the detected voltage in the second battery is less than the predetermined voltage.

29. An apparatus for supplying power to a device, the apparatus comprising:
a plurality of batteries, each battery having a terminal;
detecting means for detecting voltages of the batteries;
calculating means for calculating power consumption of the first battery from the detected voltages in the first battery, to obtain remaining power of the first battery; and
means for selecting a second battery from the plurality of batteries when the remaining power in the first battery is less than a predetermined power, to supply power from the second battery to the device, and for isolating the first battery from the device while conducting a current no less than zero through the terminal of the first battery.

30. In a system having a device and a plurality of batteries, each battery having a terminal, a method for supplying power to the device, the method comprising the steps of:
detecting voltages of the plurality of batteries;
selecting a first battery from the plurality of batteries when a detected voltage in the first battery is larger than a predetermined voltage, to supply power from the first battery to the device while conducting a positive current through the terminal of the first battery;
selecting a second battery from the plurality of batteries when the detected voltage in the first battery is less than the predetermined voltage, to supply power from the second battery to the device, and isolating the first battery from the device while conducting a current no less than zero through the terminal of the first battery; and
reselecting the first battery when the detected voltage in the second battery is less than the predetermined voltage.

31. An apparatus for supplying power to a device, the apparatus comprising:
first and second batteries for supplying power to the device;
first detecting means for detecting a voltage of the first battery;
second detecting means for detecting a voltage of the second battery;
first signaling means, responsive to the first detecting means, for signaling a power condition of the first battery; and
second signaling means, responsive to the second detecting means, for signaling a power condition of the second battery.

32. The apparatus according to claim 31, wherein the first and second signaling means each includes a light emitting diode for signaling a low battery state.

33. The apparatus according to claim 31, wherein the first and second signaling means each includes
a light emitting diode; and
a speaker for signaling.

34. The apparatus according to claim 31, further comprising display means for displaying remaining energies of the first and second batteries;

35. An information processing system comprising:
a computer system;
first and second batteries for supplying power to the computer system;
first detecting means for detecting a voltage to the first battery;
second detecting means for detecting a voltage of the second battery;
first signaling means, responsive to the first detecting means, for signaling a power condition of the first battery; and
second signaling means, responsive to the second detecting means, for signaling a power condition of the second battery.

36. The apparatus according to claim 35, wherein the first and second signaling means each includes a light emitting diode for signaling a low battery state.

37. The apparatus according to claim 35, wherein the first and second signaling means each includes
a light emitting diode; and
a speaker.

38. The apparatus according to claim 35, further comprising display means for displaying remaining energies of the first and second batteries.

39. An apparatus for supplying power to a device, the apparatus comprising:
first and second batteries for supplying power to the device;
first detecting means for detecting a power dissipation of the first battery;
second detecting means for detecting a power dissipation of the second battery;
computing means, responsive to the first and second detecting means, for computing respective remaining capacities of the first and second batteries; and
displaying means for displaying the respective remaining capacities of the first and second batteries.

40. The apparatus according to claim 39, wherein the computing means comprises a central processing unit.

41. The apparatus according to claim 39, wherein the displaying means includes means for displaying a ratio of remaining energies to initial energies of the first and second batteries.

42. An information processing system, comprising:

a computer system;

first and second batteries for supplying power to the computer system;

first detecting means for detecting a power dissipation of the first battery;

second detecting means for detecting a power dissipation of the second battery;

computing means, responsive to the first and second detecting means, for computing remaining respective capacities of the first and second batteries; and displaying means for displaying the respective remaining capacities of the first and second batteries.

43. The system according to claim 42, wherein the computing means comprises a central processing unit.

44. The system according to claim 42, wherein the displaying means includes means for displaying a ratio of remaining energies to initial energies of the first and second batteries.

* * * * *

UNITED STATES PATENT AND TRADEMARK OFFICE
CERTIFICATE OF CORRECTION

PATENT NO. : 5,270,946
DATED : December 14, 1993
INVENTOR(S) : Kazuya Shibasaki et al.

It is certified that error appears in the above-indentified patent and that said Letters Patent is hereby corrected as shown below:

In the Abstract, Front Page, last sentence delete "battgnal representing the power condition of the batteries". and insert --battery becomes less than or equal to a low battery voltage, LED is caused to blink in order to inform an operator of a low battery condition. When the terminal voltage of the second battery is greater than the low battery voltage, however, power from the second battery is supplied to the computer system. In this manner, batteries can be automatically switched without interrupting the operation of the computer system.--

Claim 5, Column 6, Line 12, change "alight" to --a light--.

UNITED STATES PATENT AND TRADEMARK OFFICE
CERTIFICATE OF CORRECTION

PATENT NO. : 5,270,946
DATED : December 14, 1993
INVENTOR(S) : Kazuya Shibasaki, et al It is certified that error appears in the above-indentified patent and that said Letters Patent is hereby corrected as shown below:

Claim 24, Column 8, Line 41, change "mans" to --means--.

Signed and Sealed this

Twenty-first Day of February, 1995

*Attest:*

BRUCE LEHMAN

*Attesting Officer*     *Commissioner of Patents and Trademarks*